US012535090B2

(12) United States Patent
Leicht et al.

(10) Patent No.: US 12,535,090 B2
(45) Date of Patent: Jan. 27, 2026

(54) PISTON-CYLINDER UNIT, SET COMPRISING A PISTON-CYLINDER UNIT AND A GROUP OF PISTON-CYLINDER UNITS

(71) Applicant: PACOMA GMBH, Eschwege (DE)

(72) Inventors: Günter Leicht, Stegaurach (DE); Karl-Wilhelm Herwig, Witzenhausen (DE)

(73) Assignee: PACOMA GMBH, Eschwege (DE)

(*) Notice: Subject to any disclaimer, the term of this patent is extended or adjusted under 35 U.S.C. 154(b) by 0 days.

(21) Appl. No.: 18/848,091

(22) PCT Filed: Mar. 16, 2023

(86) PCT No.: PCT/EP2023/056767
§ 371 (c)(1),
(2) Date: Sep. 17, 2024

(87) PCT Pub. No.: WO2023/175082
PCT Pub. Date: Sep. 21, 2023

(65) Prior Publication Data

US 2025/0207615 A1 Jun. 26, 2025

(30) Foreign Application Priority Data

Mar. 17, 2022 (EP) .................................... 22162782

(51) Int. Cl.
*F15B 15/28* (2006.01)
*F15B 15/14* (2006.01)

(52) U.S. Cl.
CPC ...... *F15B 15/2815* (2013.01); *F15B 15/1433* (2013.01); *F15B 15/2876* (2013.01); *F15B 15/2892* (2013.01)

(58) Field of Classification Search
CPC .............. F15B 15/1433; F15B 15/2876; F15B 15/2892
See application file for complete search history.

(56) References Cited

U.S. PATENT DOCUMENTS 4,316,145 A 2/1982 Tann
4,632,018 A 12/1986 Lymburner
(Continued)

FOREIGN PATENT DOCUMENTS

DE 202019101788 U1 4/2019
DE 102019122121 A1 2/2021
(Continued)

OTHER PUBLICATIONS

International Search Report and Written Opinion for Application No. PCT/EP2023/056771 dated May 26, 2023 (23 pages with translation).
(Continued)

*Primary Examiner* — Michael Leslie
(74) *Attorney, Agent, or Firm* — Michael Best & Friedrich LLP

(57) ABSTRACT

The invention relates to a piston-cylinder unit. A piston motion sensor is arranged in a transverse bore of a cylinder head of the piston-cylinder unit. According to the invention, a positioning and/or alignment element is supported in the transverse bore on a floor, on which in turn the piston motion sensor is supported. The positioning and/or alignment element predetermines the axial position of the piston motion sensor in the transverse bore. In addition, the positioning and/or alignment element can predetermine the alignment of the piston motion sensor.
The piston-cylinder unit can be used, for example, for a work machine, construction machine, agricultural machine,
(Continued)

a maritime machine, a wheeled loader, a digger, a dump truck, a crane, a forklift or a lifting platform.

14 Claims, 8 Drawing Sheets

(56) References Cited

U.S. PATENT DOCUMENTS

| | | | | |
|---|---|---|---|---|
| 4,726,282 | A | 2/1988 | Labair | |
| 5,182,980 | A | 2/1993 | Greer et al. | |
| 6,509,733 | B2 * | 1/2003 | Blubaugh | F15B 15/2892 92/5 R |
| 6,725,761 | B1 | 4/2004 | McNaughton | |
| 8,047,122 | B1 | 11/2011 | Trent et al. | |
| 8,624,773 | B2 | 1/2014 | Nguyen et al. | |
| 10,727,630 | B2 * | 7/2020 | Schmale | H01R 43/26 |
| 11,378,107 | B2 * | 7/2022 | Herwig | F15B 15/2869 |
| 11,611,179 | B2 * | 3/2023 | Grünewald | H01R 13/5202 |
| 12,241,993 | B2 * | 3/2025 | Herwig | G01S 7/027 |
| 2002/0074994 | A1 | 6/2002 | Blubaugh et al. | |
| 2002/0083826 | A1 | 7/2002 | Arshad et al. | |
| 2003/0135995 | A1 | 7/2003 | Glasson | |
| 2015/0316393 | A1 | 11/2015 | Lucchi et al. | |
| 2016/0356290 | A1 | 12/2016 | Beales et al. | |
| 2019/0296504 | A1 | 9/2019 | Schmale | |
| 2021/0320463 | A1 | 10/2021 | Grünewald et al. | |
| 2021/0332835 | A1 | 10/2021 | Giere et al. | |
| 2022/0057477 | A1 | 2/2022 | Herwig et al. | |
| 2025/0207616 | A1 * | 6/2025 | Leicht | F15B 21/003 |
| 2025/0237241 | A1 * | 7/2025 | Leicht | F15B 15/2869 |

FOREIGN PATENT DOCUMENTS

| | | | | |
|---|---|---|---|---|
| EP | 1217220 | A2 | 6/2002 | |
| EP | 3957868 | A1 | 2/2022 | |
| EP | 4246001 | A1 * | 9/2023 | F15B 15/1433 |
| EP | 4246002 | A1 * | 9/2023 | F15B 15/1433 |
| JP | S61-001704 | U | 1/1986 | |
| JP | S63-97806 | U | 6/1988 | |
| JP | S64-31207 | U | 2/1989 | |
| JP | H0399207 | A | 4/1991 | |
| JP | H10238513 | A | 9/1998 | |
| JP | H10310396 | A | 11/1998 | |
| WO | 2023175083 | A1 | 9/2023 | |
| WO | 2023175085 | A1 | 9/2023 | |

OTHER PUBLICATIONS

International Search Report and Written Opinion for Application No. PCT/EP2023/056767 dated May 26, 2023 (20 pages with translation).

International Search Report and Written Opinion for Application No. PCT/EP2023/056768 dated May 26, 2023 (18 pages with translation).

U.S. Appl. No. 18/848,088, filed Sep. 17, 2024, by Leicht et al. (Copy not submitted herewith pursuant to the waiver of 37 C.F. R. § 1.98(a)(2)(iii) issued by the Office on Oct. 19, 2004).

U.S. Appl. No. 18/848,093, filed Sep. 17, 2024, by Leicht et al. (Copy not submitted herewith pursuant to the waiver of 37 C.F. R. § 1.98(a)(2)(iii) issued by the Office on Oct. 19, 2004).

* cited by examiner

PISTON-CYLINDER UNIT, SET COMPRISING A PISTON-CYLINDER UNIT AND A GROUP OF PISTON-CYLINDER UNITS

TECHNICAL FIELD OF THE INVENTION

The present invention relates to a piston-cylinder unit. The piston-cylinder unit can be employed in a work machine (in particular a construction machine, an agricultural machine, a maritime machine, a wheeled loader, a digger, a dump truck, a crane, a forklift, a lifting platform or a different work machine known to be used in mechanical engineering). The piston-cylinder unit can serve to, for example, steer, support, slide out, incline, lift, lower or otherwise move a part of the work machine (in particular a tool, a rocker or another part of the work machine). It is preferably a hydraulic piston-cylinder unit.

Moreover, the invention relates to a set with a piston-cylinder unit, wherein this set can also be employed for a work machine.

Finally, the invention relates to a group of piston-cylinder units, wherein the group has different subgroups and the piston-cylinder units of the different subgroups are designed and intended for different applications. Such a group of piston-cylinder units can, for example, be manufactured, offered and sold by a manufacturer for the various applications or offered and sold by a distributor or stocked and/or used for the various applications by a customer.

PRIOR ART

A generic piston-cylinder unit is known from document DE 10 2019 122 121 A1. This known piston-cylinder unit is depicted in FIG. 1. FIG. 1 makes it recognisable by means of broken lines that the piston-cylinder unit 1 can actually be formed to be longer and that only a part of it is depicted. The piston-cylinder unit 1 has a cylinder 2 with a cylinder tube 31, an interior space 3 and a cylinder head 4. The cylinder tube 31 is connected to the cylinder head 4 via a welding seam 23. A bearing bush 5 is arranged in the region of the cylinder head 4. DE 10 2019 122 121 A1 deals with a hydraulic piston-cylinder unit 1, which means that the interior space 3 is filled with a hydraulic fluid 29, in particular oil. The cylinder 2 has a connector 6 and a connector 24 for this. A hydraulic circuit, which is not depicted here, is connected to a hydraulic pump and switching valves at the connectors 6, 24. The connectors 6, 24 each open into an allotted pressure chamber 32, 33. The pressure chambers 32, 33 are formed in the interior space 3 and are separated from one another by a piston 7. The piston 7 is displaceable along the longitudinal central axis 30 of the cylinder 2, with the pressure chambers 32, 33 being sealed. Depending on the pressure generated by means of the hydraulic circuit at the connectors 6, 24, an actuating force which acts on the piston 7 can be generated hydraulically with both senses of direction along the longitudinal central axis 30, and an alteration of the volume of the pressure chamber 32, 33 can be brought about with the adjusting movement of the piston 7 which is generated as a result. FIG. 1 shows the position of the piston 7 moved fully to the right, i.e. the retracted position of the piston-cylinder unit 1. The piston 7 is connected to a piston rod 8, at the outlying end of which there is arranged a piston rod eye 9. The piston rod eye 9 likewise has a bearing bush 10. The bearing bushes 5, 10 serve to link the piston-cylinder unit 1 to the parts of the work machine which are intended to be moved relative to one another by means of the piston-cylinder unit 1 and/or onto which the piston-cylinder unit 1 is intended to exert a force. The piston rod 8 is movably borne in a translational manner in the axial direction along the longitudinal central axis 30 by means of a guide bush 11. A rod seal 12, an O-ring 13 and a support ring 14 are provided for the bearing and sealing. An additional O-ring 15, a wiper 16 and a sliding bearing 17 are arranged at the other axial end of the guide bush 11. The piston 7 is arranged in a rotationally fixed manner on the piston rod 8 and is secured by means of a securing nut 18. Furthermore an O-ring 19, a piston-guiding ring 20, a piston seal 21 and another piston-guiding ring 22 are arranged at the piston 7. In this manner, the piston 7 is borne in a sealing manner jointly with the piston rod 8 and the piston rod eye 9 in the cylinder tube 31 of the cylinder 2 in a translational manner, going back and forth. A sub-chamber 25 of the pressure chamber 33 in the cylinder head 4 is attached to the part of the pressure chamber 33 which is bordered by the cylinder tube 31. The sub-chamber 25 is connected to the connector 24. An axially extending sensor signal channel 26 opens into this sub-chamber 25. The sensor signal channel 26 is also part of the pressure chamber 33 and is thus filled with the hydraulic fluid. The sensor signal channel 26 is in turn connected to a transverse bore 27 which extends radially relative to the longitudinal central axis 30 in the cylinder head 4. The transverse bore 27 extends up to the outer surface of the cylinder head 4 and can be connected to the surrounding environment by means of a compensating bore which is not depicted. A piston motion sensor 28 is arranged in the transverse bore 27. The piston motion sensor 28 serves to detect the axial position of the piston 7 in the cylinder 2 by means of high-frequency technology. For this purpose, the piston motion sensor 28 emits a high-frequency signal which hits onto the end face of the piston 7 or of the piston rod 8 through the sensor signal channel 26 and through the sub-chamber 25 and through the pressure chamber 33, and travels back to the piston motion sensor 28 after being reflected by this end side. The movement signal, in particular the path covered by the end side can then be ascertained from the reflected signal by means of the high-frequency technology, in particular by evaluating the running time. For the exemplary embodiment depicted in FIG. 1, the piston motion sensor 28 is pressurised with the hydraulic fluid. A sensor housing of the piston motion sensor 28 possesses seals with which the piston motion sensor 28 is axially sealed on both sides of the sensor signal channel 26 such that the hydraulic fluid cannot escape from the pressure chamber 33 and via the transverse bore 27. The piston motion sensor 28 possesses a connector plug 34 here which is borne by the sensor housing of the piston motion sensor 28 and which extends radially out from the cylinder head 4. With regard to further details, reference is made to document DE 10 2019 122 121 A1, which is made part of the present disclosure.

A further development of this piston-cylinder unit 1 is known from document EP 3 957 868 A1. It is proposed here that a collimator which serves to increase the measuring accuracy of the piston motion sensor is arranged in the beam path for the high-frequency signal. A collimator is understood to be an optical device for generating a beam path with parallel beams from previously non-parallel beams from divergent sources. In a first direction of radiation from a transmitter unit of the piston motion sensor to the end side of the piston or the piston rod, the collimator converts the non-parallel beams emitted by the piston motion sensor into parallel beams, which are then also reflected in parallel from the end side of the piston or the piston rod. The reflected high-frequency beams are then bundled again by the collimator in the opposite second direction of radiation so that they can be received and analysed by a receiver unit of the piston motion sensor. The collimator can also act as a type of filter that only or substantially focusses the high-frequency beams on the piston motion sensor that previously ran parallel to each other and to the longitudinal axis of the piston. Thus, it is possible to filter out high-frequency beams that do not originate, or at least do not directly originate, from the end-side piston floor surface. Such unwanted beams are due to the fact that in reality the refraction of the collimator is not ideal, the beams are not ideally emitted and received in a point-like manner and the piston floor surface is not ideally flat. The use of the collimator is intended to improve the signal-to-noise ratio. The collimator can have a dielectric lens. It is also possible to use several dielectric lenses or a Fresnel zone plate. The dielectric lens can have a convex lens surface and/or consist of a dielectric plastic or a dielectric ceramic, polytetrafluoroethylene, polyethylene or polypropylene or contain this material. The dielectric lens preferably has a dielectric constant (permittivity) that is greater than that of air and greater than that of the hydraulic fluid in the piston-cylinder unit. The permittivity can, for example, be between 20% and 50% greater than that of the hydraulic fluid in the piston-cylinder unit. The permittivity difference and the curvature of the dielectric lens are matched to each other. The dielectric lens can have a planar-convex lens shape. The convex side of the lens can face the piston. In contrast, the planar side then faces the piston motion sensor. The collimator can be formed by the sensor housing or be structurally separated from the piston motion sensor itself and the sensor housing. The piston motion sensor can also be formed as a compact built-in cartridge that contains both the sensor and the analysis electronics. The piston motion sensor is arranged with an orientation in the transverse bore so that the longest dimension of the piston motion sensor extends in the direction of the longitudinal axis of the transverse bore. Beam deflection elements can be arranged at a floor of the sub-chamber away from the sensor signal channel in order to avoid falsification of the measurement results. The collimator can be arranged in the sensor signal channel. With regard to further details, reference is made to document EP 3 957 868 A1, which is made part of the present disclosure.

PROBLEM OF THE INVENTION

The present invention is based on the problem of proposing a piston-cylinder unit with a piston motion sensor integrated in the cylinder head, which is improved with regard to

- the production costs and/or
- the variety of components and/or
- the positioning and alignment of the piston motion sensor relative to the cylinder head and/or
- the mounting and/or detaching effort and/or
- the variability of the usage conditions and the conditions of connection to the work machine.

Furthermore, the invention is based on the problem of proposing a set with a piston-cylinder unit which can be used to employ the piston-cylinder unit for various applications.

Finally, the invention is based on the problem of proposing a group of piston-cylinder units, in which two subgroups are designed and intended for different applications, but in which there is nevertheless a small variety of components.

Solution

The problem of the invention is solved according to the invention with the features of the independent patent claims.

Further preferred configurations according to the invention can be gathered from the dependent patent claims.

DESCRIPTION OF THE INVENTION

The invention proposes a piston-cylinder unit which has a cylinder with a cylinder head, a piston which can move axially in the cylinder, and a piston motion sensor. The piston motion sensor is arranged in a transverse bore of the cylinder head which has a longitudinal axis. In this respect, the piston-cylinder unit can also be formed according to the different variants in the prior art cited above.

The configuration according to the invention is based in particular on the realisation that it is crucial, for the required accuracy of the measurement results of the piston motion sensor arranged in the transverse bore, that the piston motion sensor, and thus the transmitting and/or receiving unit for the high-frequency radiation (or another sensor signal), is situated

- both in the predetermined position in the transverse bore which describes the axial position of the piston movement sensor along the longitudinal axis of the transverse bore,
- as well as in the predetermined alignment, which describes the rotational position of the piston motion sensor about the longitudinal axis of the transverse bore and thus the direction of emission of the signal of the piston motion sensor.

For the embodiments known from the prior art, this requires increased effort in the manufacturing with regard to the manufacturing tolerances on the one hand and in the mounting of the piston motion sensor in the transverse bore of the cylinder head on the other.

It is also possible that piston motion sensors and, in particular, sensor housings with different dimensions must be produced in accordance with the prior art in a series of piston-cylinder units with different dimensions (in particular different diameters of the cylinder tube and thus dimensions of the cylinder head). The reason for this is that the different dimensions of the piston-cylinder units result in different distances between the sensor signal channel inside the cylinder head and the connector plug on the outer surface of the cylinder head, which requires different lengths of the sensor housing.

The invention proposes the following improvement in this field of tension: According to the invention, a positioning and/or alignment element is employed. The positioning and/or alignment element ensures the correct positioning of the piston motion sensor in the direction of the longitudinal axis of the transverse bore, so that the positioning ensures that the high-frequency signal of the piston motion sensor passes through the sensor signal channel, any collimator and the pressure chamber at the correct point and/or strikes the end side of the piston or the piston rod at the correct point. Alternatively or cumulatively, the positioning and/or alignment element can be used to also predetermine the alignment of the piston motion sensor. If the positioning and/or alignment element is used cumulatively for positioning and aligning the piston motion sensor, it can be ensured in a simple and reliable manner that a deviation in the position and alignment of a transmitted high-frequency signal of the piston motion sensor lies within a predetermined small tolerance range. According to the invention, the positioning and/or alignment element is arranged in the transverse bore and supported in the transverse bore in the direction of the longitudinal axis of the transverse bore, namely in the mounting direction. This support can be provided, for example, on a transverse surface, inclined surface, a step, taper or an annular collar of the transverse bore. The positioning and/or alignment element thus assumes a defined axial position in the transverse bore, which can already be predetermined during the production of the transverse bore, namely during the production of the transverse surface, inclined surface, step, taper or annular collar.

The piston motion sensor is then supported on the positioning and/or alignment element in the direction of the longitudinal axis on the positioning and/or alignment element. Since the positioning and/or alignment element assumes a defined axial position in the transverse bore, it can be ensured, by supporting the piston motion sensor on the positioning and/or alignment element, that the piston motion sensor also assumes a defined position in the transverse bore.

It is advantageous that if the same piston motion sensor is used for piston-cylinder units of different dimensions, the same piston motion sensor can be used in the different piston-cylinder units, but with the predetermined position of the piston motion sensor in the transverse bore then being adjusted by the positioning and/or alignment element having different lengths.

As mentioned previously, the supporting of the positioning and/or alignment element can be ensured by any transverse surface, inclined surface, step, taper or annular collar, and the like of the transverse bore. For a particularly simple proposal of the invention, the transverse bore can be formed as a blind-hole bore, with the positioning and/or alignment element then being supported on a floor (in particular the edge region of a conical floor) of the blind-hole bore. In this case, the position of the positioning and/or alignment element and thus also of the piston motion sensor can be predetermined by the depth of the blind-hole bore.

It is possible that an alignment of the positioning and/or alignment element around the longitudinal axis of the transverse bore is predetermined. This can be achieved, for example, by a form-fit between the cross-sections of the housing of the positioning and/or alignment element and the transverse bore. For example, the transverse bore can have a groove or recess (or a rib or projection) which runs in the direction of the longitudinal axis and which co-operates in a form-fitting manner with a rib or projection (or a groove or recess) of the housing of the positioning and/or alignment element. However, it is also possible that the alignment of the positioning and/or alignment element is ensured in that an end side of the housing of the positioning and/or alignment element facing the floor of the transverse bore has an eccentric recess (or projection) which engages in a corresponding projection (or recess) in the floor.

A further aspect of the invention is dedicated to securing the positioning and/or aligning element within the transverse bore. It is proposed that at least one securing element is provided. The securing element serves to secure the longitudinal position of the positioning and/or alignment element in the transverse bore. Thus, the securing element serves to ensure that both the positioning and/or alignment element and the piston motion sensor are in their predetermined position and also remain in operation. Alternatively or cumulatively, it is possible that the at least one securing element is used to secure the alignment of the positioning and/or alignment element about the longitudinal axis of the transverse bore (and thus in certain circumstances also to secure the alignment of the piston motion sensor).

There are a variety of possibilities for the type of the configuration of the securing element. For example, a securing bolt, a securing split pin, a latching connection, a tongue and groove connection to secure an alignment, etc. can thus be used. For a very simple embodiment, the securing element is a screw. The screw can extend parallel to the longitudinal axis of the transverse bore. It is possible, for example, that the screw extends through a bore from the other side through the floor of the blind-hole bore. However, it is also possible that a screw, which forms the securing element, extends radially to a longitudinal axis of the transverse bore. In each case, the screw is accessible from the outside on the cylinder head and extends through a bore to the positioning and/or alignment element, where the screw is then screwed onto an internal thread of the positioning and/or alignment element. Furthermore, it is possible that the positioning and/or alignment element has both a threaded bore on the face side, which is used when the screw extends parallel to the longitudinal axis of the transverse bore, and a radially oriented threaded bore for mounting in the event that the screw extends radially to the longitudinal axis of the transverse bore.

The positioning and/or alignment element and the piston motion sensor preferably lie directly against one another via contact surfaces. These contact surfaces can ensure the correct positioning of the piston motion sensor in the direction of the longitudinal axis of the transverse bore.

It is possible that not only the axial position of the piston motion sensor in the transverse bore must be predetermined. Rather, it may also be necessary to predetermine an alignment of the piston motion sensor with regard to its angle of rotation about the longitudinal axis of the transverse bore. Predetermining the angle of rotation may be necessary, for example, so that a sensor signal emitted by the piston motion sensor can pass through a sensor signal channel and/or hit an end face of the piston or the piston rod at a defined point and/or at a defined alignment. This alignment can be predetermined, for example, by the piston motion sensor interacting in a form-fitting manner with the transverse bore in the circumferential direction so that, on the one hand, the alignment is predetermined via the form-fit and, on the other hand, an alignment predetermined in this manner is also maintained during operation as a result. For example, the transverse bore may have a groove, which runs in the direction of the longitudinal axis, or a recess in which a protrusion or rib of the housing of the piston motion sensor is then arranged. Conversely, it is possible that the transverse bore has a rib, which runs in the direction of the longitudinal axis, or a protrusion that engages in a groove or recess of the housing of the piston motion sensor. It is also possible that the transverse bore on the one hand and the housing of the piston motion sensor on the other hand have corresponding, non-round, e.g. elliptical, cross-sections that ensure a precisely fitting employment in the correct alignment.

For a proposal of the invention, the contact surfaces of the positioning and/or alignment element on the one hand and of the piston motion sensor on the other hand are connected to one another via a form-fit in the circumferential direction around the longitudinal axis of the transverse bore. This form-fit then restricts or even predetermines the possible relative alignments of the piston motion sensor on the one hand and of the positioning and/or alignment element (hereinafter referred to as contact elements) on the other hand. There are a variety of possibilities for this form-fit. To give just a few examples that do not limit the invention, one of the two contact elements can have a projection that engages in a depression in the other contact element. It is also possible for an end face of a contact element to have a step that interacts in a form-fitting manner with a corresponding step of the other contact element to ensure anti-twist protection and predetermining of the alignment.

A further aspect of the invention is dedicated to enabling detaching of the piston motion sensor, which can be done, for example, for maintenance purposes, in the event of a defect in the piston motion sensor, for cleaning purposes or to use another piston motion sensor with a different measuring range or a different measuring accuracy. In this case, it is advantageous if the piston motion sensor is releasably held on the positioning and/or alignment element, but the connection nevertheless ensures a certain holding force. It is advantageous if only a detaching force that exceeds a threshold value of the holding force of the connection has to be applied for detaching.

For an embodiment of the invention, the piston motion sensor is connected to the positioning and/or alignment element via a latching connection. In this case, the latching force of the latching connection specifies the threshold value for the holding force-if the fitter applies a detaching force to the piston motion sensor that is greater than the latching force, the latching connection can be released and the piston motion sensor can be detached from the positioning and/or alignment element and removed from the transverse bore.

For another embodiment, a permanent magnet is used, which generates a magnetic holding force between the piston motion sensor and the positioning and/or alignment element. In this case, the threshold value for the holding force is predetermined by the magnetic force for the detachment. Within the scope of the invention, it is also possible that the piston movement sensor and the positioning and/or alignment element each have a permanent magnet, between which the magnetic force is then generated.

For detaching, the fitter can apply the required detaching force in any way. For one proposal of the invention, the piston motion sensor has a detachment catch in the region of a face side on the side that faces away from the positioning and/or alignment element. The detachment catch can be coupled to a detaching tool. The required detaching force can be applied onto the piston motion sensor via the detaching tool and the detachment catch. For example, the detachment catch can be designed as a type of hook connection into which a counter-hooking detaching tool is hooked, the detachment catch and the detaching tool can form a latching connection or the detachment catch and the detaching tool can be connected to one another via a permanent magnet. For a particular proposal of the invention, the detachment catch is an internal thread of the piston motion sensor. A detaching rod can then be screwed into this internal thread, so that the required detaching forces can then be applied onto the piston motion sensor via the detaching rod which protrudes from the transverse bore after screwing-in.

The internal thread can be formed from a solid material of the sensor housing. For one proposal of the invention, the internal thread is formed by a threaded insert. This threaded insert can then be injected into a sensor housing of the piston motion sensor or pressed into a bore in the sensor housing. The use of such a threaded insert is advantageous, for example, if the sensor housing is made of a material in which the production of an internal thread does not provide the required strength. In this case, a stronger material, in particular metal, can be selected for the material of the threaded insert. The stronger material can then provide the required strength for the threaded connection in the region of the thread. On the other hand, the threaded insert can have an enlarged outer surface, which then enables a large-area connection and power transmission to the sensor housing.

In principle, it is possible for a connector plug to be formed directly by, or held on, the sensor housing and to protrude outwards from the transverse bore and the cylinder head, where the connector plug can then be connected to the required connection cables. For one proposal of the invention, the piston motion sensor is connected to a housing plug via a sensor cable. The sensor unit thus has two sub-units, namely the piston motion sensor and the housing plug, which are flexibly connected to one another via the sensor cable. The connection via the sensor cable enables, in a simple manner, an adjustment for the use of the same piston motion sensor and the same housing plug for piston-cylinder units with different dimensions, by the sensor cable then being able to be installed more or less curved or stretched for the different installation situations. On the other hand, under certain circumstances, the sensor housing can be formed to be less solid or shorter, since the sensor housing does not have to bridge the entire radial region from the actual measuring area to the connecting plug, but rather a partial area can be bridged by the sensor cable.

It is particularly advantageous if the sensor cable is releasably connected to the piston motion sensor and/or the housing plug. This enables, for example, a separate mounting of initially only the piston motion sensor, then the connection of the sensor cable and finally the mounting of the housing plug, with a corresponding separate detaching also being able to take place. Furthermore, it is possible that, for example for maintenance purposes or in the event of a defect, only a piston motion sensor or a housing plug needs to be replaced, while the remaining part of the piston motion sensor and the housing plug can then continue to be used.

For a particular proposal of the invention, however, the releasable connection to the sensor cable also makes it possible for the same piston motion sensor to be able to be used with different housing plugs in order to enable adaptation to different applications that require different housing plugs.

It is also advantageous if the housing plug is releasably connected to the cylinder head. In one proposal of the invention, the housing plug possesses a flange for this purpose. The flange can then be screwed onto the cylinder head, enabling a reliable connection between the housing plug and the cylinder head.

It is even possible for the flange to be screwed to the cylinder head in different orientations of the housing plug around the longitudinal axis of the transverse bore, which allows the respective installation conditions to be taken into account.

It is possible for any different housing plugs at all to be used within the scope of the invention. On the one hand, the housing plugs can thus have a different shape. It is possible that a first housing plug is formed in a straight line, while a second housing plug that can be used within the scope of the invention is designed to be L-shaped. In this case, the housing plug can have two angled limbs. One limb then extends into the interior of the transverse bore of the cylinder head. The sensor cable can then be connected in the region of an end side of this limb. In contrast, the other limb extends on the outside of the cylinder head. It is possible for this leg to extend radially to the longitudinal axis of the transverse bore. For an installation situation, the leg is oriented parallel to the longitudinal central axis of the cylinder of the piston-cylinder unit, which is advantageous for some applications. In this case, the end side of the latter leg can be used to connect a connecting cable.

In addition to the use of housing plugs of different shapes in the piston-cylinder unit according to the invention, the housing plugs can alternatively or cumulatively also be equipped with different connection geometries and assignment of the pins.

a) It is possible, for example, for a first type of housing plug to be formed as a so-called DIN plug. For example, this can be a DIN plug M12, which can be formed with 5 pins. Such DIN plugs are described in the standards DIN 41524 (3-pin and 5-pin), DIN 45322 (5-pin with 60° spacing), DIN 45326 (8-pin) and DIN 45329 (7-pin) (these standards are replaced by EN 60130-9).

For this first type of housing plug, different subtypes can then be used, which differ in the assignment of the connection pins:

aa) For a first subtype, a first pin is not assigned. A second pin is assigned to the VDC function (voltage supply of the piston motion sensor). A third pin is assigned to the GND (earth) function. A fourth pin is assigned to the CAN HI data bus, while a fifth pin is assigned to a CAN LO data bus.

ab) For a second sub-type of the first type, a first pin may not be assigned, a second pin may be assigned to the VDC, a third pin may be assigned to GND, a fourth pin may be assigned to a pulse-width modulated signal and a fifth pin may not be assigned.

b) For a second type of housing plug, the housing plug is formed as a so-called German plug (Deutsch-Stecker), which can be, for example, a German plug DT 04 with four pins.

Different subtypes are also possible for the second type:

ba) For example, a first subtype of the second type can be equipped with a first pin that ensures the VDC function. The second pin is assigned to the CAN LO function, a third pin is assigned to the GND function and a fourth pin is assigned to the CAN HI function.

bb) In contrast, for a second subtype of the second type, a first pin can be assigned to the VDC function, a second pin can be assigned to the GND function, a third pin can be assigned to the PWM function and a fourth pin can be unassigned.

According to the invention, it is possible for one and the same piston motion sensor to be optionally combined with housing plugs of different geometries and angles of the legs of the housing plug and/or housing plugs of the different types and subtypes mentioned, via the releasable sensor cable, depending on the requirements and intended application.

For the embodiments known from the prior art, the piston motion sensor was hydraulically connected to the pressure chamber via the sensor signal channel, so that the piston motion sensor itself was pressurised with the hydraulic fluid. This required that the sensor housing of the piston motion sensor was equipped with ring grooves on both sides of the sensor signal channel, in order to seal the piston motion sensor in the transverse bore. If these embodiments require an exchange of the piston motion sensor, it is necessary to drain the hydraulic fluid, because otherwise the hydraulic fluid for the detached piston motion sensor would exit out of the transverse bore. For one configuration of the piston-cylinder unit, the invention proposes that the transverse bore is hydraulically separated from the pressure chamber via a sealing element. In this case, the piston motion sensor can be detached from the transverse bore without it being possible for the hydraulic fluid to pass over to the transverse bore, since the sealing element blocks passage. Here, the sealing element is preferably designed, and its material selected, such that it allows the high-frequency radiation of the piston motion sensor to pass through and, as far as possible, does not adversely affect it.

For one particular proposal of the invention, the sealing element is configured as a collimator, such that in this case the collimator is multifunctional, because it guarantees the desired bundling of beams and parallel alignment and additionally acts as a sealing element. It is possible here that the collimator has, in the region of its outer surface, at least one ring groove into which there is inserted a sealing ring, in particular an O-ring, which, under the effect of sealing, interacts with the sensor signal channel in which the collimator is arranged.

A further solution to the problem on which the invention is based is represented by a set which has a piston-cylinder unit as described previously. The set has at least two housing plugs. These two housing plugs are designed and intended for different applications. Thus, for example, the two different housing plugs can be housing plugs of the aforementioned different geometries, types and/or subtypes. The two housing plugs can then be optionally inserted into the transverse bore and the selected housing plug can be affixed to the housing of the piston-cylinder unit. Here, the housing plug selected in each case is then connected to the piston motion sensor by means of the sensor cable. In this manner, the customer can be provided with a set, by means of which the same piston motion sensor can be connected to different housing plugs in different installation situations, as a result of which the range of applications can be expanded and the variety of components can be reduced.

A further solution to the problem on which the invention is based is represented by a group of piston-cylinder units as described previously. Here, the group has two different subgroups of piston-cylinder units, these two subgroups being designed and intended for different applications. In the first subgroup, the piston-cylinder units have first housing plugs, while the piston-cylinder units have the second housing plugs in the second subgroup. The first housing plugs and the second housing plugs are designed and intended for different applications, with the piston-cylinder units of the two subgroups being designed and intended for different applications. The first housing plugs and second housing plugs can differ from one another through the aforementioned geometries, types and/or subtypes. Identically constructed piston motion sensors are then present in the piston-cylinder units of the first subgroup and the piston-cylinder units of the second subgroup. For example, such a group with the different subgroups can be offered by a manufacturer or a distributor so that the customer can then acquire the piston-cylinder units of the first subgroup or the second subgroup units, depending on the application. However, it is also possible for such a group of piston cylinder units for the different applications to be kept in stock by an end customer, in a repair shop or by a manufacturer of a work machine.

Advantageous developments of the invention emerge from the patent claims, the description and the drawings.

The advantages of features and combinations of several features mentioned in the description are merely examples and can have an alternative or cumulative effect without the advantages necessarily having to be achieved by embodiments according to the invention.

With regard to the disclosure—not the scope of protection—of the original application documents and the patent, the following applies: Further features are to be taken from the drawings—in particular the geometries shown and the relative dimensions of several components to each other as well as their relative arrangement and effective connection. The combination of features of different embodiments of the invention or of features of different patent claims is also possible in deviation from the selected back references of the patent claims and is hereby suggested. This also applies to those features which are shown in separate drawings or mentioned in their description. These features can also be combined with features of different patent claims. Likewise, features listed in the patent claims may be omitted for further embodiments of the invention, but this does not apply to the independent patent claims of the granted patent.

The features mentioned in the patent claims and the description are to be understood with regard to their number in such a way that exactly this number or a greater number than the number mentioned is present, without the explicit use of the adverb "at least" being necessary. Thus, for example, when one element is mentioned, this is to be understood as meaning that exactly one element, two elements or more elements are present. The features listed in the patent claims can be supplemented by further features or be the only features that the subject matter of the respective patent claim has.

The reference signs contained in the patent claims do not represent a limitation of the scope of the subject-matter protected by the patent claims. They only serve the purpose of making the patent claims easier to understand.

BRIEF DESCRIPTION OF THE DRAWINGS

The invention will be explained further and described below with the aid of the preferred exemplary embodiments depicted in the figures.

DESCRIPTION OF THE DRAWINGS

Figure 1:
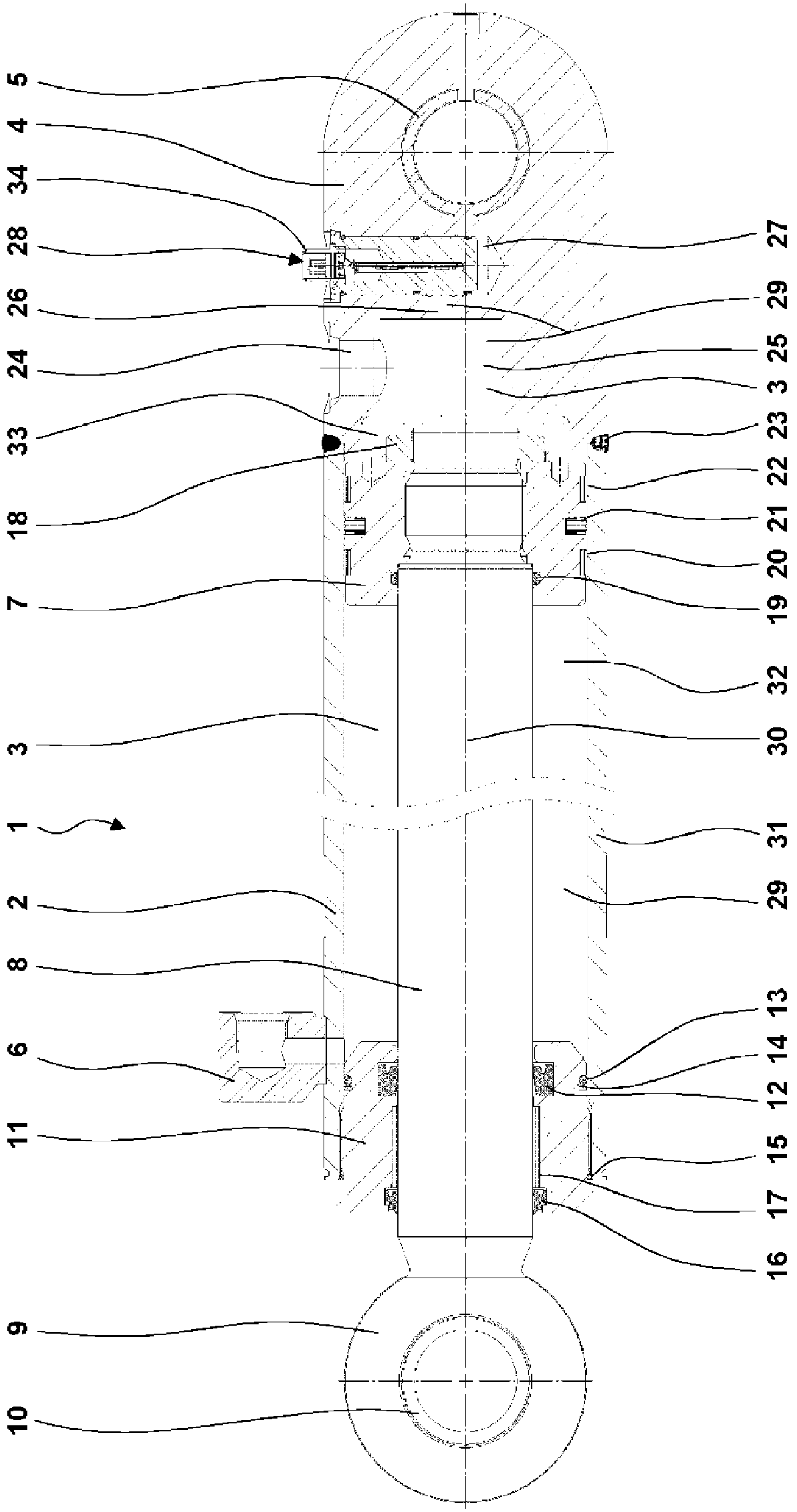
PRIOR ART Fig. 1
FIG. 1 shows, in a longitudinal section, a piston-cylinder unit according to the prior art.

Unless something different emerges from the text below, the statements made above regarding the prior art and regarding the embodiment according to FIG. 1 can apply accordingly to the embodiments according to the invention, with the further disclosure in documents DE 10 2019 122 121 A1 and EP 3 957 868 A1 also being able to be employed within the framework of the invention.

Figure 2:
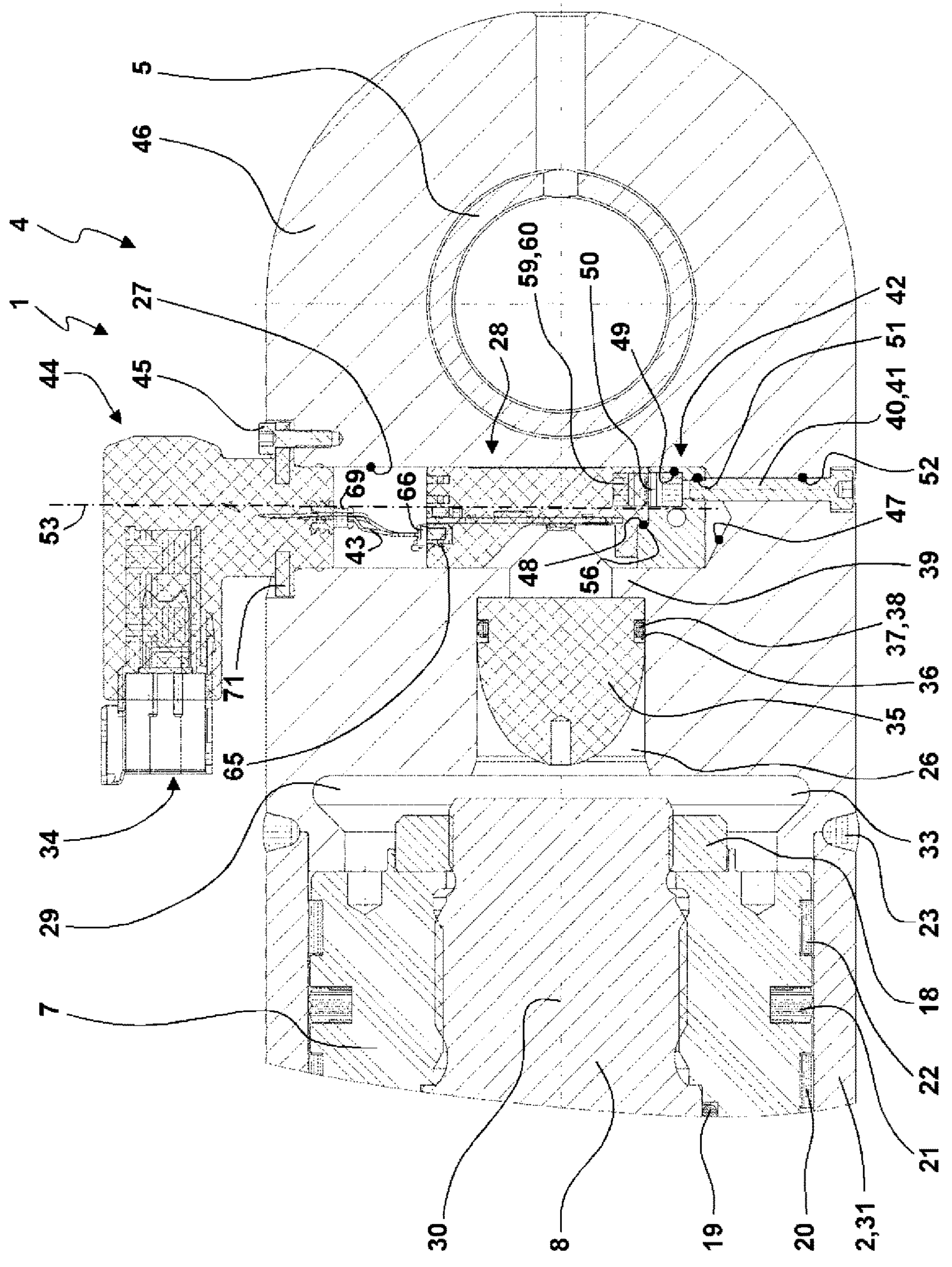
FIG. 2 shows, in a partial longitudinal section, a piston-cylinder unit in the region of the cylinder head.

FIG. 2 shows a piston-cylinder unit 1 in the region of the cylinder head 4. A sensor signal channel 26 opens into the pressure chamber 33 of the piston-cylinder unit 1. A collimator 35 is arranged in the sensor signal channel 26. The collimator 35 possesses, on the side facing the piston motion sensor 28, a flat end face which is aligned transversely to the longitudinal central axis 30. With regard to the longitudinal central axis 30, the collimator 35 is formed in a rotationally symmetrical manner on the other side, wherein the collimator 35 can, for example, have a curved and in particular parabolic longitudinal section, as shown. The collimator 35 possesses a ring groove 36 in which a sealing element 37, in this case an O-ring 38, is arranged. The sealing element 37 ensures a hydraulic seal between the inner wall of the sensor signal channel 26 and the collimator 35. The sensor signal channel 26 possesses a shoulder 39, which is circumferential here. If the pressure chamber 33 is pressurized with hydraulic pressure, the hydraulic pressure acting on the spherical end face facing the piston 7 leads to a hydraulic force which presses the collimator 35 against the shoulder 39. This pressing of the collimator 35 on the shoulder 39 and/or the effect of the sealing element 37 can ensure that the transverse bore 27 is not pressurised by hydraulic fluid and therefore no additional sealing measures need to be taken in the transverse bore 27. On the other hand, this seal makes it possible to detach the piston motion sensor 28 without hydraulic fluid being able to escape from the transverse bore 27.

Figure 3:
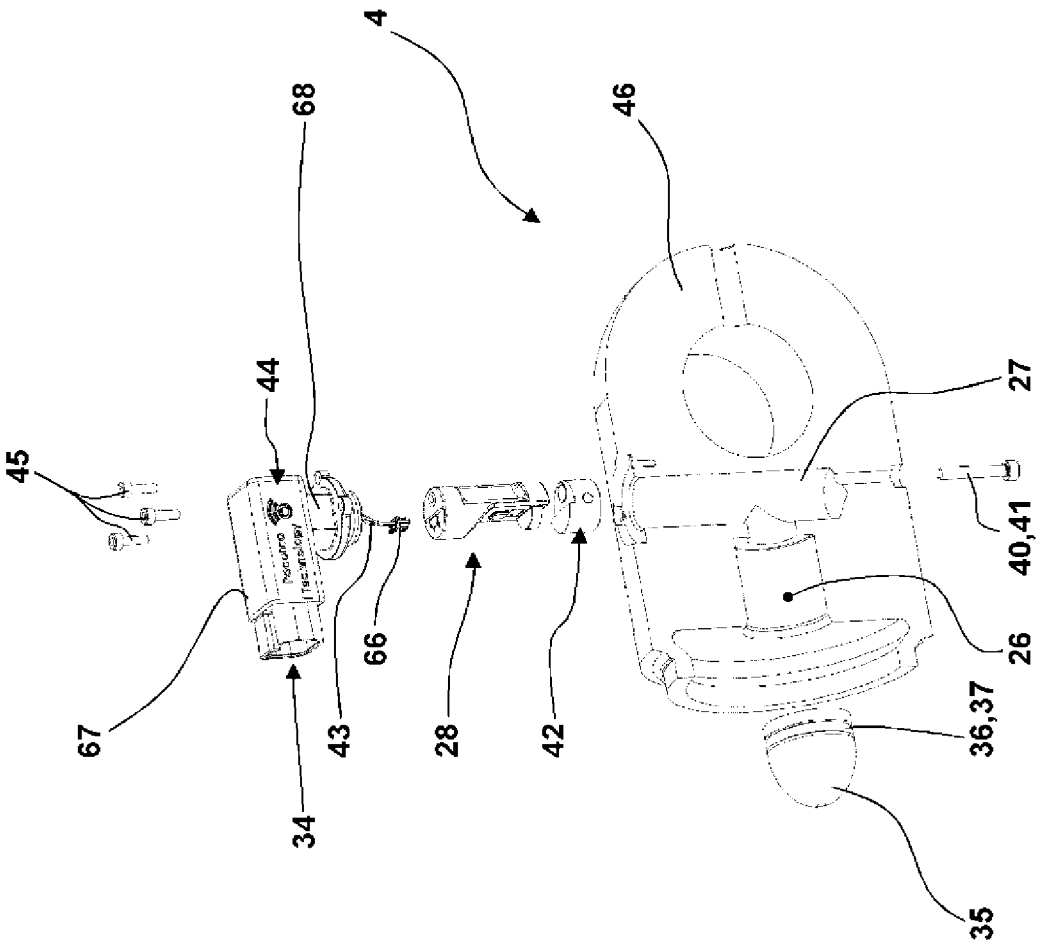
FIG. 3 shows, in a spatial exploded view, the cylinder head according to FIG. 2 with allotted structural elements.

As can be seen from the exploded depiction in FIG. 3, a securing element 40 in the form of a screw 41, a positioning and/or alignment element 42, the piston motion sensor 28, a sensor cable 43 and a housing plug 44 are mounted in the transverse bore, with the housing plug 44 being affixed to a housing 46 of the cylinder head 4 via affixing screws 45.

Figure 4:
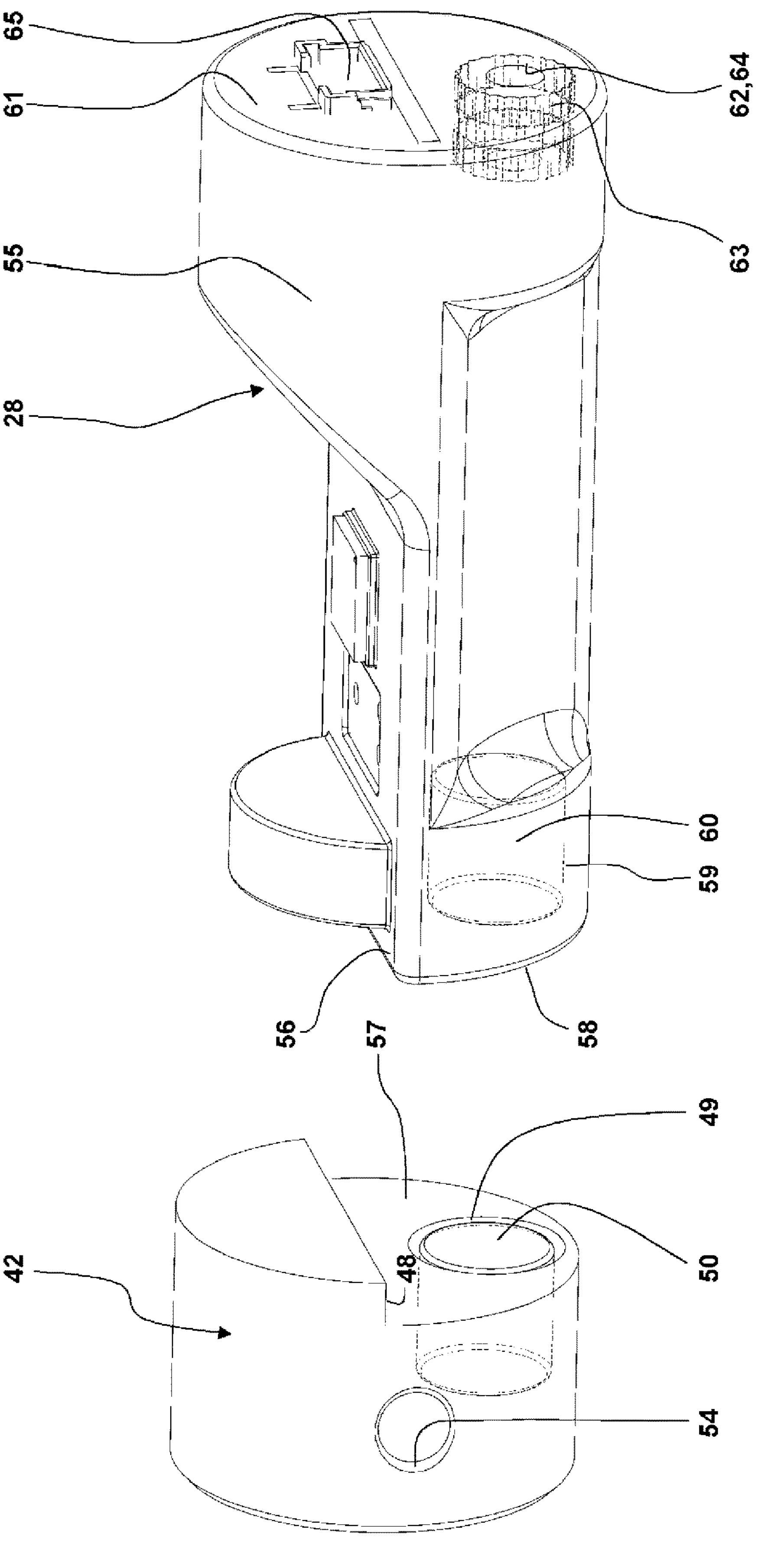
FIG. 4 shows, in a spatial view, a piston motion sensor and a positioning and/or alignment element.

According to FIG. 4, the positioning and/or alignment element 42 is formed to be cylindrical with a diameter such that the positioning and/or alignment element 42 can be inserted into the transverse bore 27 with a precise fit. The underside of the positioning and/or alignment element 42 is formed to be flat for the depicted exemplary embodiment. The underside of the positioning and/or alignment element 42 lies against a floor 47 of the transverse bore 27, which is formed here as a blind-hole bore.

On the side facing the piston motion sensor 28, the positioning and/or alignment element 42 is basically flat, but is formed with a step 48. On this side, the positioning and/or alignment element 42 possesses a (here cylindrical) receptacle 49 in which a permanent magnet 50 is accommodated, which can be glued onto, or pressed into, the receptacle 49. The outer surface of the permanent magnet 50 is arranged flush with a partial surface of the end side of the positioning and/or alignment element 42 away from the step 48.

On the side facing away from the piston motion sensor 28, the positioning and/or alignment element 42 possesses an internal thread 51 arranged eccentrically to the longitudinal axis 53 of the transverse bore 27. In the aligned position of the positioning and/or alignment element 42 installed in the transverse bore 27, the internal thread 51 of the positioning and/or alignment element 42 is aligned with an eccentric bore 52 which opens into the transverse bore 27 and through which the screw 41 extends through the housing 46 from the outside. In this manner, the positioning and/or alignment element 42 is fixed in the correct position and alignment.

It is possible that the positioning and/or alignment element 42 also has a transverse bore 54, possibly with an internal thread. If a bore 52, which is oriented parallel to the longitudinal axis 53 of the transverse bore 27, is not present or used as depicted in FIG. 2, but rather if a bore, which is oriented vertically to the drawing plane according to FIG. 2, is provided in the housing 46, it is possible, as an alternative to the affixing via the screw 41, that fixing of the positioning and/or alignment element 42 takes place via a screw which extends vertically to the drawing plane according to FIG. 2 through the housing 46 and which is screwed in the inner end region with the transverse bore 54 of the positioning and/or alignment element 42.

The piston motion sensor 28 has a sensor housing 55, the external geometry of which is cylindrical with a diameter such that the sensor housing 55 can be accommodated in the transverse bore 27 with a precise fit. Compared to this external geometry, the sensor housing 55 has recesses in the region of which the electronics unit and the transmitting and/or receiving unit for the high-frequency signal are arranged.

On the side facing the positioning and/or alignment element 42, the sensor housing 55 has a step 56, which is formed corresponding to the step 48 of the positioning and/or alignment element 42. Away from the steps 48, 56, the positioning and/or alignment element 42 and the sensor housing 55 form contact surfaces 57, 58 which are orientated transverse to the longitudinal axis 53 and in the region of which these structural elements lie against one another in the direction of the longitudinal axis 53, whereby the axial position of the piston motion sensor 28 is predetermined.

In contrast, the steps 48, 56 form a form-fit with respect to a rotation about the longitudinal axis 53, whereby the alignment of the piston motion sensor 28 is predetermined. In the relative alignment predetermined by the steps 48, 56, a corresponding receptacle 59 with a permanent magnet 60 is provided on the sensor housing 55 in alignment with the receptacle 49 and the permanent magnet 50 of the positioning and/or alignment element 42. The permanent magnet 60 is also fixed in the receptacle 59, for example by gluing or being pressed in. The magnetic force between the permanent magnets 50, 60 secures the contact and thus the position and alignment between the positioning and/or alignment element 42 and the piston motion sensor 28.

On the side facing away from the positioning and/or alignment element 42, the sensor housing 55 has a flat end face 61. In the region of this end face 61, the piston motion sensor 28 possesses an internal thread 62 which is formed here by a threaded insert 63 injection-molded into the sensor housing 55. The internal thread 62 forms a detachment catch 64.

Furthermore, there is provided in the end side 61 a plug receptacle 65 into which a plug 66 of the sensor cable 43 can be plugged. The format of the plug 66 and the plug receptacle 65 is preferably a 5-pin Pico-Clasp connection (registered trademark).

Figure 6:
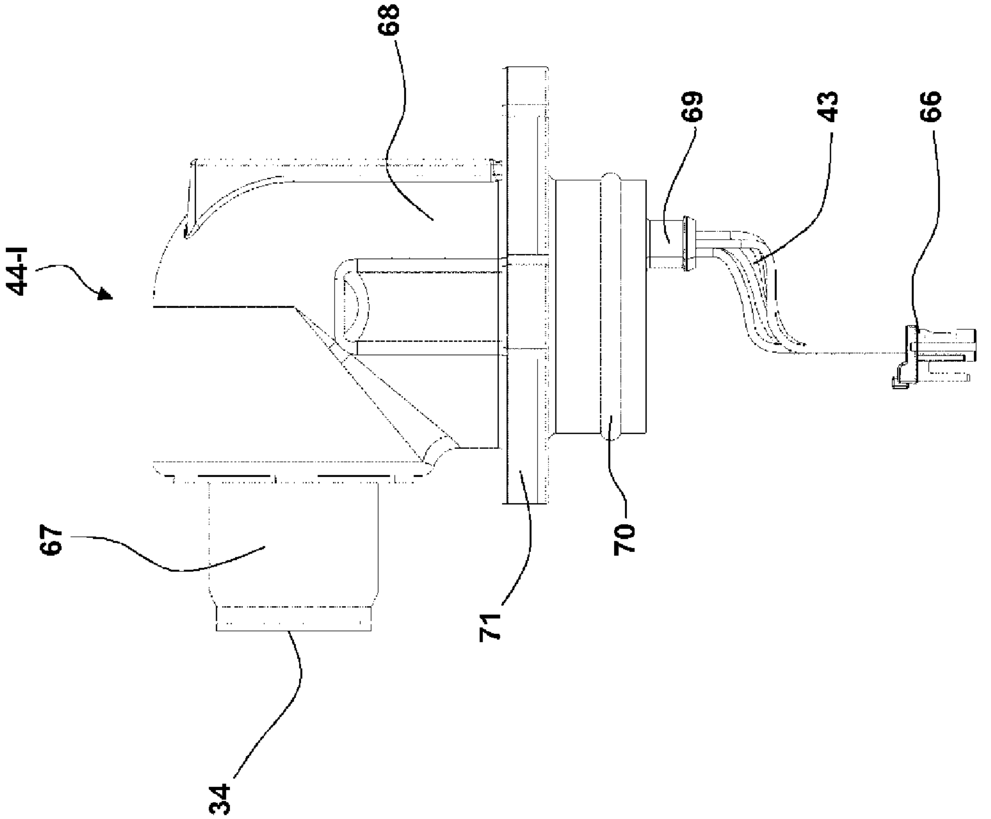
FIG. 6 shows the housing plug with a sensor cable according to FIG. 5 in a side view.
Figure 5:
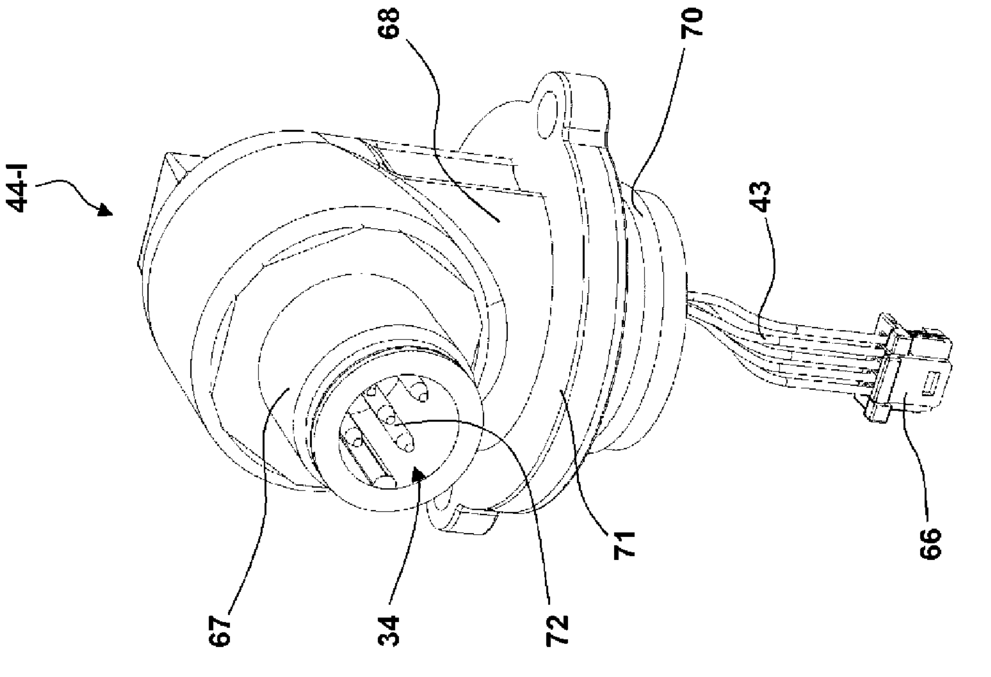
FIG. 5 shows, in a spatial view, a housing plug of the DIN-plug (5 pin) type with a sensor cable.

FIGS. 5 and 6 show a housing plug 44-I, with "I" indicating here that it is a housing plug of a first type (see the explanations regarding the first type above).

As can be seen in FIG. 6, the housing plug 44-I is formed as an L-shape with a limb 67 and a limb 68 angled at an angle of 90° here. In the end side of the limb 68, there is provided a plug receptacle, into which a plug 69 of the sensor cable 43 can be plugged. Preferable, both the plug receptacle and the plug 69 have the "Pico-Clasp" format.

The outer end region of the limb 68 extends into the transverse bore 27 when oriented coaxially to the longitudinal axis 53. The end region of the limb 68 can possess a circumferential bead 70 or a sealing element. In the state inserted into the transverse bore 27, the bead 70 produces a frictionally engaged, elastically prestressed securing of the limb 68 in the transverse bore 27. In addition, a seal can be provided here.

In the exit region of the limb 68 from the housing 46 of the cylinder head 4, the limb 68 has a flange 71 which is circumferential here. The flange 71 is accommodated in a corresponding receptacle or depression in the housing 46. The flange 71 possesses through-bores which are oriented parallel to the longitudinal axis 53 and via which the flange 71 can be screwed together with corresponding threaded bores in the housing 46. Preferably, several bores are provided in the flange 71 as well as threaded bores in the housing 46, so that the housing plug 44-I can be screwed to the housing 46 in different alignments about the longitudinal axis 53.

The end region of the limb 67 forms the connector plug 34 which enables the connection of the connector cable.

For the housing plug 44-I, the connector plug 34 possesses 5 pins 72, as can be seen in particular in FIG. 5. In particular, this is a connector plug 34 of the "DIN connector plug M 12 5 pin" type. Here, the housing plug 44-I of the first type can be formed according to the sub-types explained above.

Figure 8:
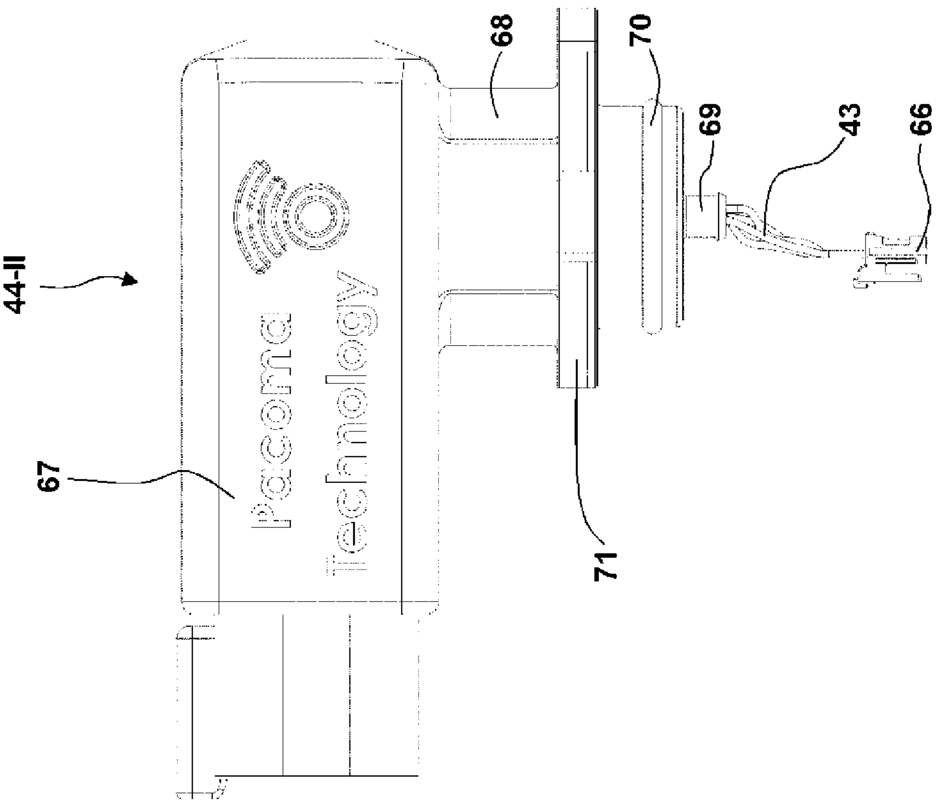
FIG. 8 shows the housing plug according to FIG. 7 in a side view.
Figure 7:
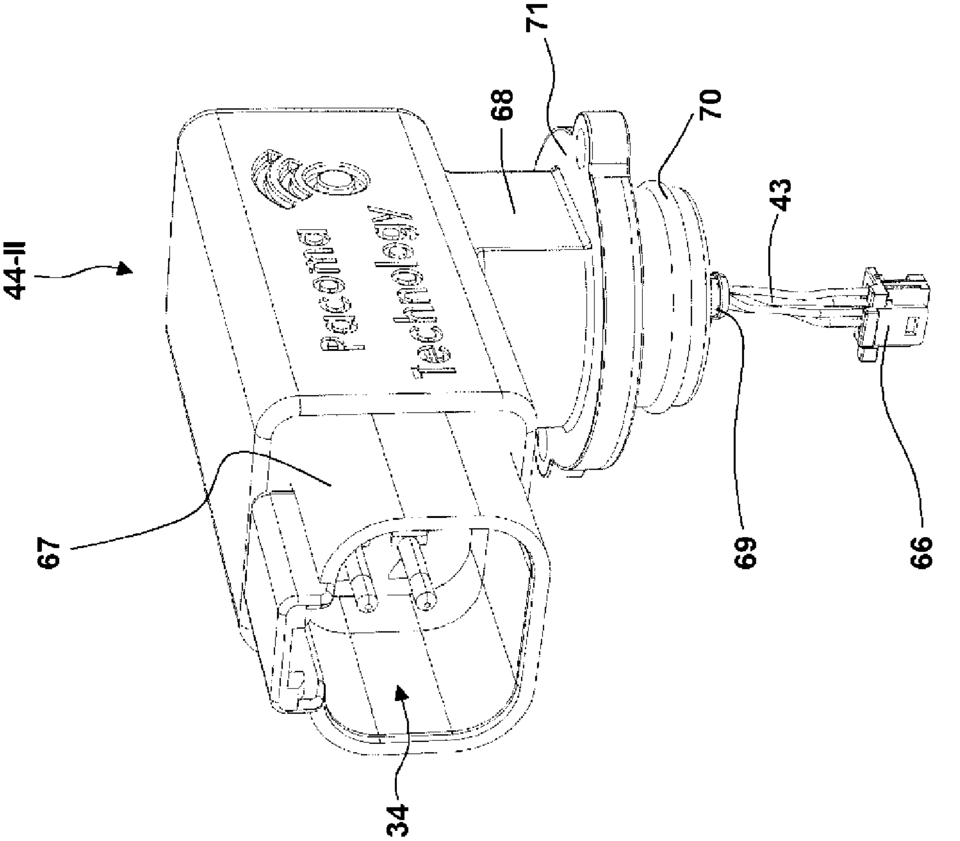
FIG. 7 shows, in a spatial view, a housing plug of the German plug (4 pin) type with a sensor cable.

FIGS. 7 and 8 show a housing plug 44-II, with "II" indicating here that it is a housing plug of a second type. Here, the housing plug 44-II of the second type can be formed according to the sub-types explained above.

Figure 9:
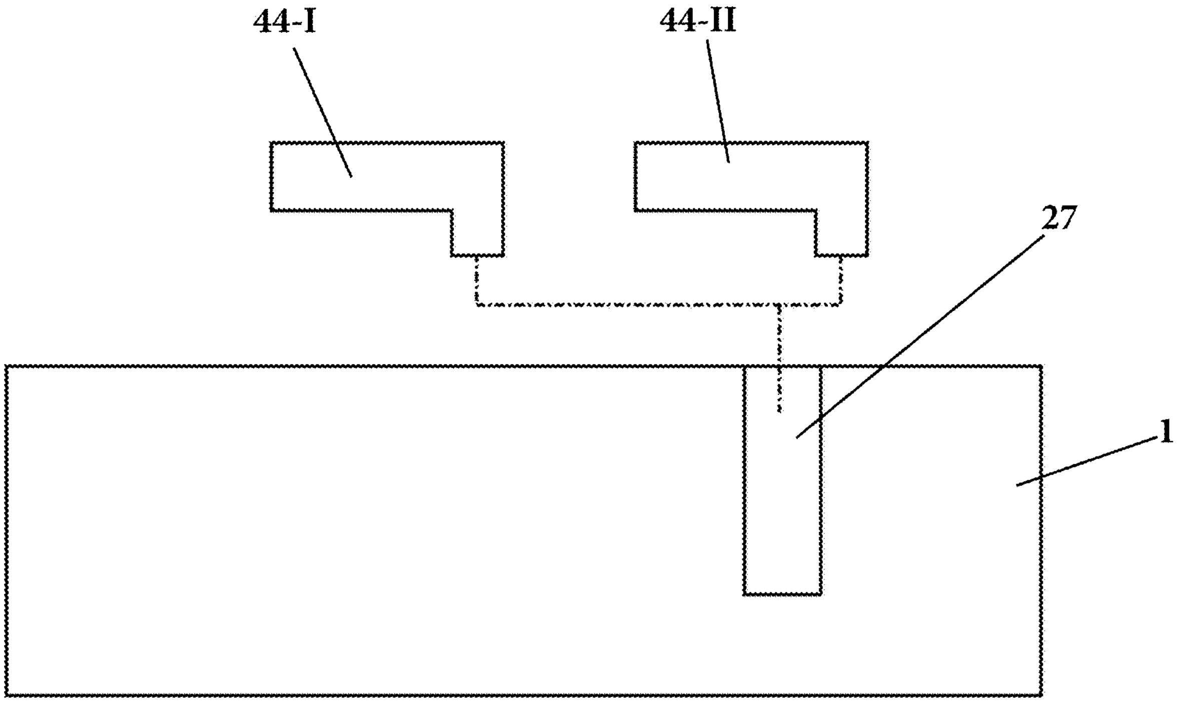
FIG. 9 shows a set including a piston-cylinder unit and multiple housing plugs.

FIG. 9 shows a set including the piston-cylinder unit 1 and the two housing plugs 44-I, 44-II, which are designed and intended for different applications, selectively insertable into the transverse bore 27, and are connectable to the piston motion sensor 28 via the sensor cable 43.

The electronic structural elements are integrated in each case into the housing plug 44 in order to modify the transmitted signals from the plug 69 to the connector plug 34.

By means of the piston motion sensors 28, a direct measurement of the stroke of the piston 7 or of the piston rod 8 within the piston-cylinder unit 1 is performed. The piston motion sensor 28 is preferably based on a contactlessly measuring radar system, in which the running time between a transmitting unit, the end face of the piston 7 or of the piston rod 8 and of the reflected signal back to a receiving unit is analysed. The position and/or speed can then be detected with high accuracy and robustness from the running time.

The piston-cylinder unit 1 is preferably formed with the integrated piston motion sensor 28 in accordance with the IP69K protection class.

It is possible that a stroke in the range of 10 mm to 2,000 mm, for example 30 mm to 1,800 mm or 40 mm to 1,600 mm, can be detected by means of the piston motion sensor 28. A resolution in the range of 0.2 mm to 4 mm, for example 0.5 mm to 2 mm or 0.8 mm to 1.5 mm, can be achieved here.

Furthermore, an advantage of the sealing of the sensor signal channel 26 by a sealing element or a multifunctional collimator 35 is that the high hydraulic pressures, which can also be 100 bar to 600 bar, cannot lead to deformations, stresses and damage to the piston motion sensor 28, the sensor housing 55 and the electronic structural elements of the piston motion sensor 28.

The Pico Clasp plug employed for the sensor cable 43 and its connection to the piston motion sensor 28 and the housing plug 44 can possess five pins, which can be assigned to GND, VDC, CAN LO, CAN HI and an analogue signal.

The analogue signal can be used to transmit a pulse-width modulated signal (PWM), with the measurement signal being transmitted via the pulse-width modulation. Alternatively, a voltage or current that is proportional to the measurement signal can be transmitted as an analogue signal.

In some circumstances, the piston motion sensor 28 measures not only the stroke and/or the speed of the piston 7 or of the piston rod 8. Alternatively, other measured variables (such as temperature) can also be measured, transmitted and/or analysed. The temperature can be used for temperature compensation.

It is also possible that bidirectional transmission is possible via the housing plug 44, with which an update of the software of the piston motion sensor 28 can take place and update functions can be performed.

If a PWM signal is transmitted, it preferably has a frequency of 500 Hz. The duty cycle provides information about the measured path of the piston. If the piston is fully retracted, then, for example, the duty cycle can be 5%, while the duty cycle can be 95% for the piston in the fully extended state.

Figure 10:
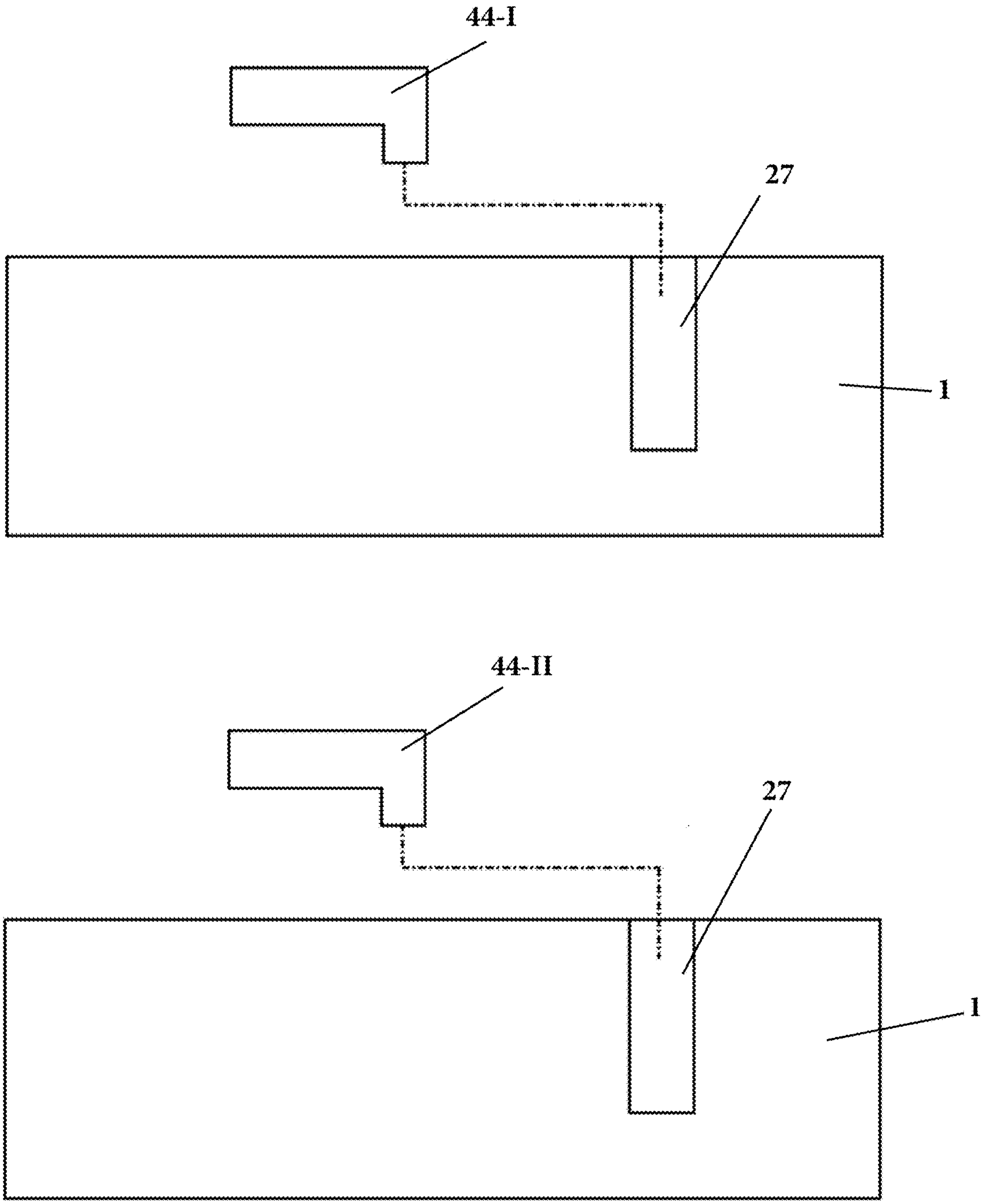
FIG. 10 shows a group of piston-cylinder units.

FIG. 10 illustrates a group of piston-cylinder units including a plurality of subgroups designed and intended for a different applications. Each subgroup of the plurality of subgroups includes a piston-cylinder unit 1, with identically constructed piston motion sensors 28. The piston-cylinder unit 1 of a first subgroup has a first housing plug 44-I, and the piston-cylinder unit 1 of the second subgroup has a second housing plug 44-II. The first housing plug 44-I and the second housing plug 44-II are designed and intended for different applications.

LIST OF REFERENCE NUMBERS

1 piston-cylinder unit
2 cylinder
3 interior space
4 cylinder head
5 bearing bush
6 connector
7 piston
8 piston rod
9 piston rod eye
10 bearing bush
11 guide bush
12 rod seal
13 O-ring
14 support ring
15 O-ring
16 wiper
17 sliding bearing
18 securing nut
19 O-ring
20 piston-guiding ring
21 piston seal
22 piston-guiding ring
23 welding seam
24 connector
25 sub-chamber
26 sensor signal channel
27 transverse bore
28 piston motion sensor
29 hydraulic fluid
30 longitudinal central axis of the cylinder
31 cylinder tube
32 pressure chamber
33 pressure chamber
34 connector plug
35 Collimator
36 ring groove
37 sealing element
38 O-ring
39 shoulder
40 securing element
41 screw
42 positioning and/or alignment element
43 sensor cable
44 housing plug
45 affixing screws
46 housing
47 floor
48 step
49 receptacle
50 permanent magnet
51 internal thread
52 bore
53 longitudinal axis
54 transverse bore
55 sensor housing
56 step
57 contact surface
58 contact surface
59 receptacle
60 permanent magnet
61 end face
62 internal thread
63 threaded insert
64 detachment catch
65 plug receptacle
66 sensor cable plug
67 limb
68 limb
69 sensor cable plug
70 bead
71 flange
72 pin

The invention claimed is:

1. A piston-cylinder unit
a) with a cylinder having a cylinder head,
b) with a piston axially movable in the cylinder and
c) with a piston motion sensor,
d) wherein the piston motion sensor is arranged in a transverse bore of the cylinder head, having a longitudinal axis, and
e) wherein a positioning and/or alignment element is supported in the transverse bore in the direction of the longitudinal axis of the transverse bore and the piston motion sensor is supported at the positioning and/or alignment element in the direction of the longitudinal axis, and
f) wherein the piston motion sensor is held on the positioning and/or alignment element via a permanent magnet.

2. The piston-cylinder unit according to claim 1, wherein the transverse bore is a blind-hole bore and the positioning and/or alignment element is supported on a floor of the blind-hole bore.

3. The piston-cylinder unit according to claim 1, wherein
a) a position of the positioning and/or alignment element in the direction of the longitudinal axis of the transverse bore, and/or
b) an alignment of the positioning and/or alignment element around the longitudinal axis of the transverse bore, is/are secured by a securing element, wherein the securing element is a screw which extends parallel to the longitudinal axis of the transverse bore or radially to the longitudinal axis of the transverse bore.

4. The piston-cylinder unit according to claim 1, wherein the positioning and/or alignment element and the piston motion sensor lie against one another via contact surfaces, which restrict or predetermine an alignment of the piston motion sensor relative to the positioning and/or alignment element via a form-fit in circumferential direction around the longitudinal axis of the transverse bore.

5. The piston-cylinder unit according to claim 1, wherein the piston motion sensor has, on the side facing away from the positioning and/or alignment element, a detachment catch which can be coupled to a detachment tool in order to apply detachment forces onto the piston motion sensor to detach the piston motion sensor from the positioning and/or alignment element, wherein the detachment catch is formed as an internal thread of the piston motion sensor and the internal thread is formed by a threaded insert, which is injected or pressed into a sensor housing of the piston motion sensor.

6. The piston-cylinder unit according to claim 1, wherein the piston motion sensor is connected to a housing plug via a sensor cable, wherein the sensor cable is releasably connected to the piston motion sensor and/or the housing plug.

7. The piston-cylinder unit according to claim 6, wherein the housing plug is releasably connected to the cylinder head.

8. The piston-cylinder unit according to claim 7, wherein the housing plug has a flange, which is screwed to the cylinder head.

9. The piston-cylinder unit according to claim 8, wherein the flange can be screwed to the cylinder head in different alignments of the housing plug about the longitudinal axis of the transverse bore.

10. The piston-cylinder unit according to claim 6, wherein the housing plug is formed as an L-shape with two angled limbs, and wherein a) one limb extends into the transverse bore of the cylinder head, and b) one limb extends outside of the cylinder head.

11. The piston-cylinder unit according to claim 6, wherein the housing plug a) is formed as a DIN plug b) or as a German plug.

12. The piston-cylinder unit according to claim 1, wherein the transverse bore is hydraulically separated from a pressure chamber via a sealing element.

13. A set comprising:

a) the piston-cylinder unit according to claim 1; and b) two housing plugs, which ba) are different from each other, bb) are selectively insertable into the transverse bore, and bc) are connectable to the piston motion sensor via a sensor cable.

14. A group of piston-cylinder units comprising:

a) a plurality of subgroups, each subgroup of the plurality of subgroups including the piston-cylinder unit of claim 1, wherein each subgroup of the plurality of subgroups is different from each other, a) the piston-cylinder unit of a first subgroup of the plurality of subgroups has a first housing plug, b) the piston-cylinder unit of a second subgroup of the plurality of subgroups has a second housing plug, c) the first housing plug and the second housing plug are different from each other, and d) the piston-cylinder unit of the first subgroup and the piston-cylinder unit of the second subgroup have identically constructed piston motion sensors.

* * * * *